(12) United States Patent
Powlousky et al.

(10) Patent No.: US 12,066,142 B2
(45) Date of Patent: Aug. 20, 2024

(54) PIPELINE PIG TRACKING AND LOCATOR

(71) Applicant: Comtel Systems, Ltd., Edmonton (CA)

(72) Inventors: William Powlousky, Edmonton (CA); Jeremy Navarro, Sangudo (CA)

(73) Assignee: Comtel Systems, Ltd., Edmonton (CA)

( * ) Notice: Subject to any disclaimer, the term of this patent is extended or adjusted under 35 U.S.C. 154(b) by 0 days.

(21) Appl. No.: 18/534,674

(22) Filed: Dec. 10, 2023

(65) Prior Publication Data
US 2024/0191826 A1     Jun. 13, 2024

Related U.S. Application Data (60) Provisional application No. 63/432,004, filed on Dec. 12, 2022.

(51) Int. Cl.
*G01V 3/08*      (2006.01)
*F16L 55/48*     (2006.01)
*G01V 11/00*     (2006.01)

(52) U.S. Cl.
CPC .............. *F16L 55/48* (2013.01); *G01V 3/088* (2013.01); *G01V 11/00* (2013.01)

(58) Field of Classification Search
CPC .......... F16L 55/48; G01V 3/088; G01V 11/00
USPC ........................................................ 324/344
See application file for complete search history.

(56) References Cited

U.S. PATENT DOCUMENTS

| | | | |
|---|---|---|---|
| 2,428,326 A | 9/1947 | Fay et al. | |
| 2,601,248 A | 6/1952 | Brenholdt et al. | |
| 2,601,249 A | 6/1952 | Brenholdt et al. | |
| 2,820,959 A | 1/1958 | Bell et al. | |
| 4,491,018 A * | 1/1985 | Stringer | H01H 36/0046 200/61.42 |
| 5,065,098 A | 11/1991 | Salsman et al. | |
| 5,417,112 A | 5/1995 | Rosenberg et al. | |
| 8,261,623 B2 | 9/2012 | Miller et al. | |
| 9,172,406 B2 | 10/2015 | Farque et al. | |
| 2004/0088169 A1 * | 5/2004 | Smith | G10H 1/0091 704/500 |
| 2004/0170086 A1 * | 9/2004 | Mayer | H04R 1/083 367/178 |

(Continued)

OTHER PUBLICATIONS

Tian et al., Numerical Investigation on ELF Electromagnetic Field Distribution of Pipeline Robot Tracking and Positioning System Using UAV, Hindawi Journal of Sensors, vol. 2022, Article ID 4247277, https://doi.org/10.1155/2022/4247277.

(Continued)

*Primary Examiner* — Christopher P McAndrew
(74) *Attorney, Agent, or Firm* — Shackelford, McKinley & Norton, LLP (57) ABSTRACT

An exemplary pipeline pig tracking and locator system includes a low frequency electromagnetic receiver in communication with a control circuit to communicate a received low frequency electromagnetic signal to the control circuit, where the control circuit is configured to transform the received low frequency electromagnetic signal to an audible frequency signal; and a speaker in communication with the control circuit to output the audible frequency signal. Additional embodiments of the present disclosure pertain to a method for locating a pipeline pig in a pipeline by utilizing the systems of the present disclosure.

26 Claims, 8 Drawing Sheets

(56) References Cited

U.S. PATENT DOCUMENTS

| | | | |
|---|---|---|---|
| 2006/0107773 A1* | 5/2006 | Abney | F16L 55/48 |
| | | | 73/865.9 |
| 2006/0274902 A1* | 12/2006 | Hume | H04S 7/30 |
| | | | 381/17 |
| 2008/0041173 A1* | 2/2008 | Tormoen | F16L 55/48 |
| | | | 73/866.5 |
| 2009/0013806 A1* | 1/2009 | Miller | F16L 55/48 |
| | | | 73/865.8 |
| 2014/0329478 A1 | 11/2014 | Farque et al. | |
| 2016/0258568 A1* | 9/2016 | Mayorov | H04W 4/80 |
| 2016/0319980 A1* | 11/2016 | Hofer | G01V 15/00 |
| 2019/0123835 A1* | 4/2019 | Poe | F16L 41/008 |

OTHER PUBLICATIONS

International Search Report for PCT/IB2023/000760, mailed on Apr. 16, 2024.

* cited by examiner

PIPELINE PIG TRACKING AND LOCATOR

CROSS-REFERENCE TO RELATED APPLICATIONS

This application claims priority to U.S. Provisional Pat. App. No. 63/432,004, filed on Dec. 12, 2022. The entirety of the aforementioned application is incorporated herein by reference.

BACKGROUND

A need exists for more improved systems and methods for locating pipeline pigs in various pipelines. Numerous embodiments of the present disclosure aim to address the aforementioned need.

SUMMARY

In some embodiments, the present disclosure pertains to a pipeline pig tracking and locator system that includes a low frequency electromagnetic receiver in communication with a control circuit to communicate a received low frequency electromagnetic signal to the control circuit. In some embodiments, the control circuit is configured to transform the received low frequency electromagnetic signal to an audible frequency signal. In some embodiments, the pipeline pig tracking and locator system also includes a speaker in communication with the control circuit to output the audible frequency signal.

Additional embodiments of the present disclosure pertain to a method for locating a pipeline pig in a pipeline. In some embodiments, the methods of the present disclosure generally include one or more of the following steps: (1) positioning a pipeline pig in a pipeline; (2) positioning a low frequency electromagnetic receiver at a location relative to the pipeline; (3) receiving, by the low frequency electromagnetic receiver, a low frequency electromagnetic signal from the pipeline pig located in the pipeline; (4) transforming the low frequency electromagnetic signal received by the low frequency electromagnetic receiver to an audible frequency signal; (5) listening, by a user, to the audible frequency signal; and (6) locating the pipeline pig within the pipeline.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion. As will be understood by those skilled in the art with the benefit of this disclosure, elements and arrangements of the various figures can be used together and in configurations not specifically illustrated without departing from the scope of this disclosure.

DETAILED DESCRIPTION

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Although relative terms such as "outer," "inner," "upper," "lower," and similar terms have been used herein to describe a spatial relationship of one element to another, it is understood that these terms are intended to encompass different orientations of the various elements and components in addition to the orientation depicted in the figures. Additionally, as used herein, the term "substantially," "about," "generally," and similar terms are used as terms of approximation and not a terms of degrees, and are intended to account for the inherent deviations in measured and calculated values that would be recognized by a person of skill in the art. Furthermore, as used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Inline pipeline inspection involves sending an inspection tool through a pipe, typically while the pipe is carrying product. The inspection tools are commonly referred to as "pigs" and the process of sending a pig through a pipe is known in the industry as "pigging". The pigs often travel through the pipeline for long distances and are propelled by the movement of the product (either liquid or gas) in the pipeline. Typically, to provide the motive force to move the pig, polyurethane sealing cups, or disks, are integrated into the pig's construction. The cups may completely seal or semi-seal at or against the inner wall of the pipe, creating a pressure differential that powers or propels the pig through the pipe.

As a matter of safety and logistics, pipeline operators must exercise great care with respect to the location, status or movement of a pig while the pig is in the pipeline. A lost pig could damage the system or cause an expensive shutdown. To prevent these problems, operators carefully guide the pig by opening and closing valves to direct the pig past pumping stations and "un-piggable" segments of the pipeline. In order to guide the pig, the pipeline operators must know the location of the pig and know when it has passed specific landmarks. During a pigging operation, tracking teams must monitor specific points along the pipeline to determine when the pig passes the landmark.

Many instruments are currently in use to detect the passage of inspection pigs as they travel through pipelines. Typically, pigs exhibit a variety of characteristics during use that make them possible to detect as they pass underground through a pipeline. For example, many pigs use magnets as a part of the inspection process. The magnets generate a magnetic field that is detectable above ground.

Also, virtually all pigs create noise and vibrations as they move through the pipe. Sensitive geophones or accelerometers or seismographs can pick up these noises and allow tracking technicians to listen for the pig's approach and subsequent passage. Further, many pigs carry an onboard transmitter that emits a low frequency electromagnetic field (typically in the 15 to 22 Hz range). Electromagnetic fields in these frequencies can pass through metal pipes and earth and can be detected above the surface with the proper equipment. However, these low frequencies, if converted to audio, are below or at the lower frequency limits of human hearing, are more felt than heard by a human, and can be very hard to discern as a true pitch (e.g., 20 Hz to 40 Hz).

As such, a need exists for more improved systems and methods for locating pipeline pigs in various pipelines. Numerous embodiments of the present disclosure aim to address the aforementioned need.

In some embodiments, the present disclosure pertains to a pipeline pig tracking and locator system. In some embodiments, the system includes a control circuit and a low frequency electromagnetic receiver in communication with the control circuit. In some embodiments, the low frequency electromagnetic receiver is configured to communicate a received low frequency electromagnetic signal from a pipeline pig to the control circuit. In some embodiments, the control circuit is configured to transform the received low frequency electromagnetic signal to an audible frequency signal.

In some embodiments, the systems of the present disclosure also include a speaker in communication with the control circuit. In some embodiments, the speaker is configured to output the audible frequency signal.

In some embodiments, the systems of the present disclosure also include a geophone in communication with the control circuit and configured to convert ground movement into voltage. In some embodiments, the systems of the present disclosure also include a visual output device in communication with the control circuit and configured to provide one or more visual outputs related to the received low frequency electromagnetic signal and/or audible frequency signal. In some embodiments, the systems of the present disclosure also include a pipeline pig with an electromagnetic transmitter configured to emit a low frequency electromagnetic signal to the low frequency electromagnetic receiver.

Figure 1:
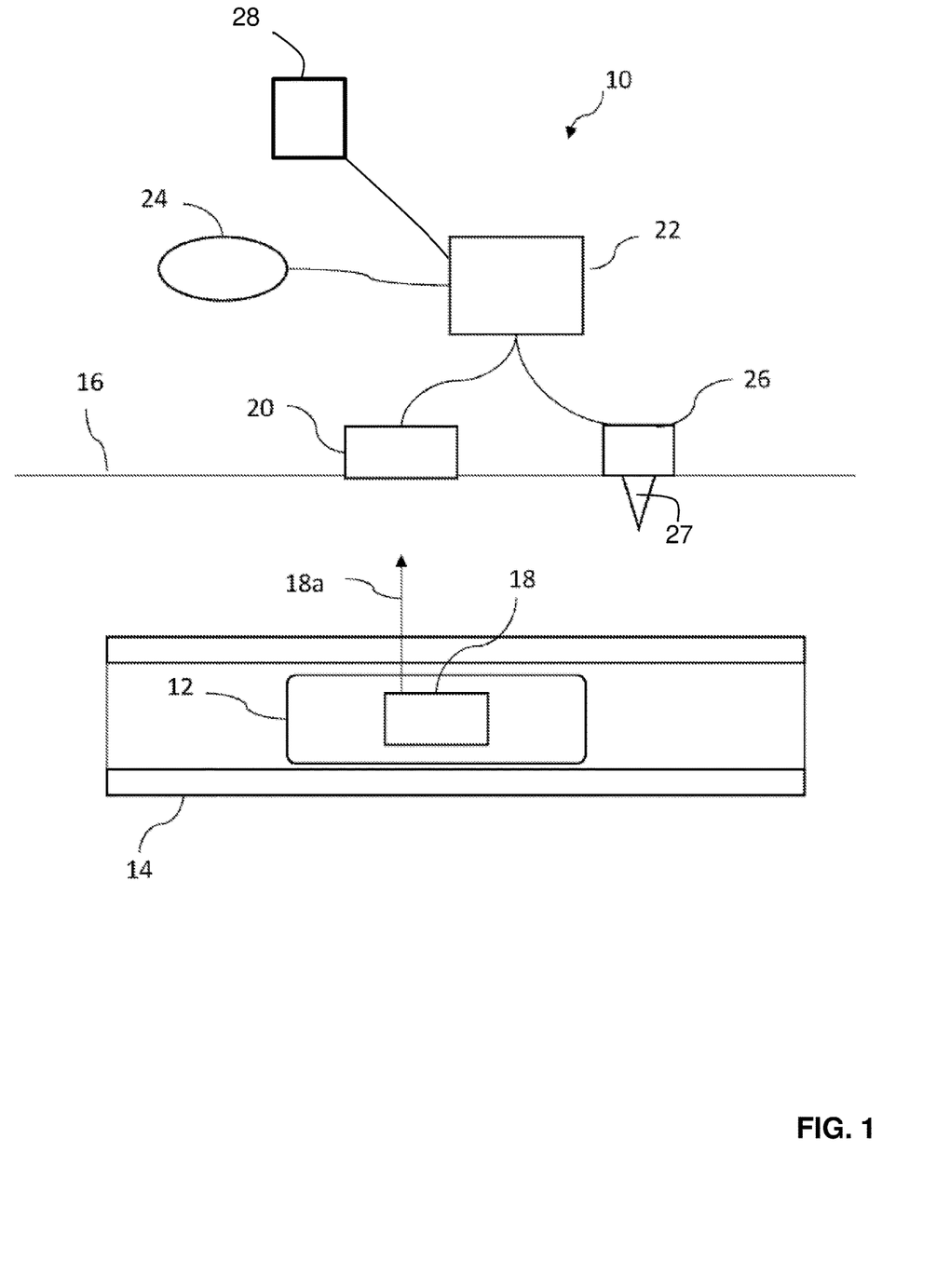
FIG. 1 is a schematic view of a pipeline pig tracking and locator system according to one or more aspects of the disclosure.

FIG. 1 illustrates an exemplary system 10 for tracking and/or locating a pipeline pig inside of a pipeline. In particular, FIG. 1 shows a system that includes pipeline pig 12, low frequency electromagnetic receiver 20, control circuit 22, speaker 24, geophone 26 with spike 27, and visual output device 28. In this illustration, pipeline pig 12 is positioned inside of a pipeline 14 that is located below ground level 16. Pipeline pig 12 includes an electromagnetic ("EM") transmitter 18 that emits a low frequency electromagnetic signal 18a. Low frequency electromagnetic receiver 20 is configured to receive the low frequency electromagnetic signal 18a emitted by EM transmitter 18.

Low frequency electromagnetic receiver 20 is in communication with control circuit 22. Control circuit 22 is configured to transform the received low frequency electromagnetic signal 18a to an audible frequency signal.

Speaker 24 is also in communication with control circuit 22. Speaker 24 is configured to output the transformed audible frequency signal.

System 10 may also include a geophone 26 in communication with control circuit 22. Geophone 26 may also include spike 27 for insertion into ground 16. A signal received by geophone 26 can be communicated to control circuit 22, amplified, and mixed with the transformed low frequency electromagnetic signal. System 10 may also include a visual output device 28 in communication with the control circuit and configured to provide one or more visual outputs related to the received low frequency electromagnetic signal and/or audible frequency signal.

Figure 2:
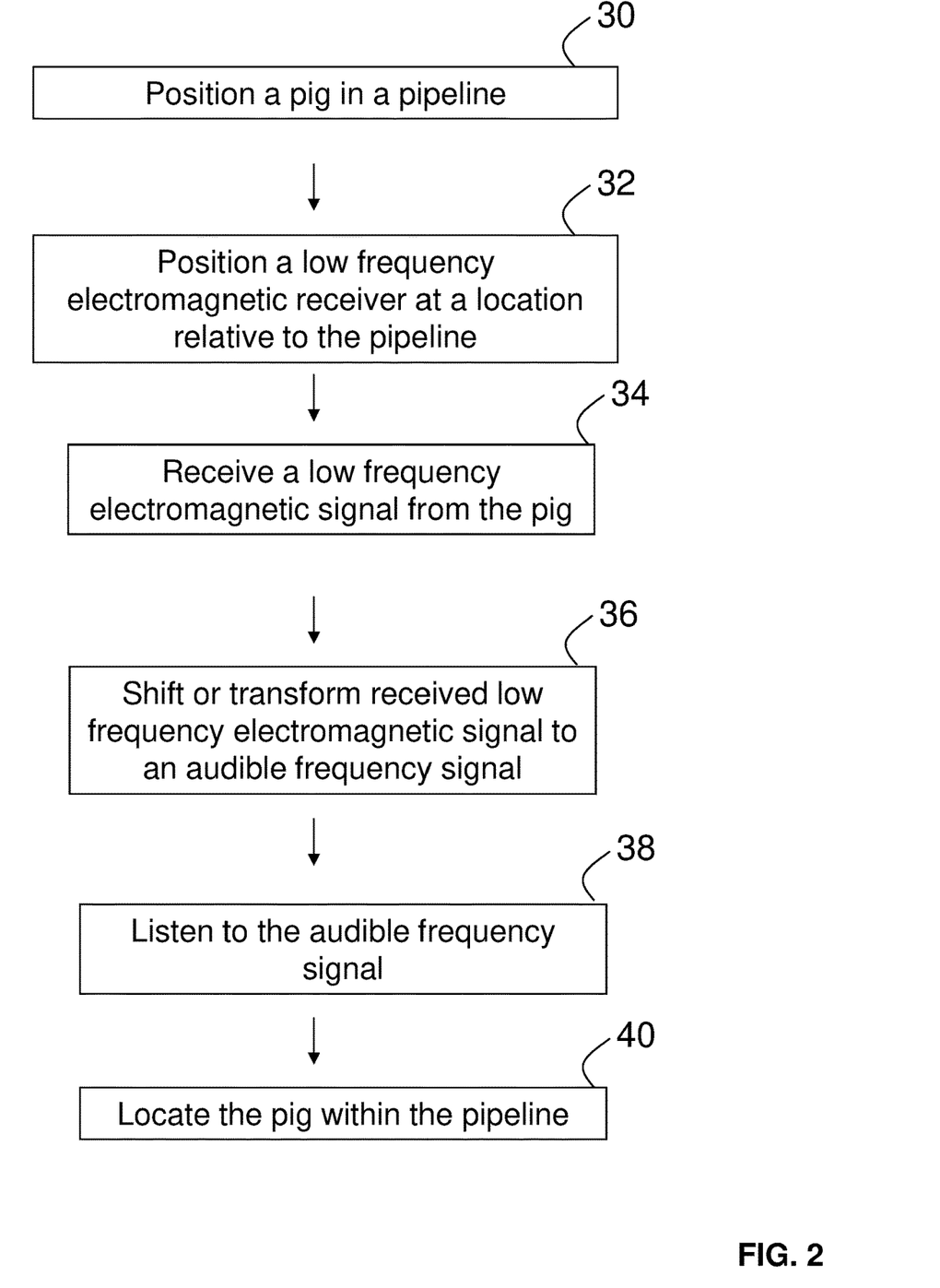
FIG. 2 is an illustration of a method for locating a pipeline pig in a pipeline according to one or more aspects of the disclosure.

Additional embodiments of the present disclosure pertain to a method for locating a pipeline pig in a pipeline. As illustrated in FIG. 2, the methods of the present disclosure generally include one or more of the following steps: positioning a pipeline pig in a pipeline (step 30); positioning a low frequency electromagnetic receiver at a location relative to the pipeline (step 32); receiving, by the low frequency electromagnetic receiver, a low frequency electromagnetic signal from the pipeline pig located in the pipeline (step 34); transforming the low frequency electromagnetic signal received by the low frequency electromagnetic receiver to an audible frequency signal (step 36); listening, by a user, to the audible frequency signal (step 38); and locating the pipeline pig within the pipeline (step 40).

In some embodiments, the methods of the present disclosure may be implemented through the utilization of the systems of the present disclosure. For instance, with reference to system 10 described in FIG. 1 for illustrative purposes, a pipeline pig 12 carrying an EM transmitter 18 is positioned inside of pipeline 14 (Step 30 in FIG. 2). A low frequency electromagnetic receiver 20 is then positioned at a location relative to pipeline 14 (Step 32 in FIG. 2). Low frequency electromagnetic receiver 20 then receives a low frequency electromagnetic signal 18a from pipeline pig 12 located in pipeline 14 (Step 34, FIG. 2). The received low frequency electromagnetic signal 18a is then communicated to control circuit 22, where it is transformed to an audible frequency signal (Step 36, FIG. 2). The audible frequency signal is then communicated to speaker 24 for output, where the human user listens to the audible frequency signal (Step 38, FIG. 2). Thereafter, pipeline pig 12 is located within pipeline 14 (Step 40, FIG. 2).

As set forth in more detail herein, the methods and systems of the present disclosure can have numerous embodiments.

Low Frequency Electromagnetic Receivers

Low frequency electromagnetic receivers generally refer to devices that are configured to receive low frequency electromagnetic signals. The methods and systems of the present disclosure can utilize various types of low frequency electromagnetic receivers. For instance, in some embodiments, the low frequency electromagnetic receiver is in the form of an antenna. In some embodiments, the low frequency electromagnetic receiver is in the form of an extremely low frequency ("ELF") antenna.

The low frequency electromagnetic receivers of the present disclosure may be configured to receive various low frequency electromagnetic signals. For instance, in some embodiments, the low frequency electromagnetic signal includes frequencies ranging from about 3 Hz to about 300 Hz. In some embodiments, the low frequency electromagnetic signal includes frequencies ranging from about 3 Hz to about 100 Hz. In some embodiments, the low frequency electromagnetic signal includes frequencies ranging from about 5 Hz to about 32 Hz.

Low frequency electromagnetic signals may be transmitted from various sources. For instance, in some embodiments, low frequency electromagnetic signals may be transmitted from a transmitter of a pipeline pig. In such embodiments, low frequency electromagnetic signals may also be referred to as low frequency electromagnetic transmitter signals.

The methods of the present disclosure may position low frequency electromagnetic receivers at various locations relative to a pipeline. For instance, in some embodiments, the low frequency electromagnetic receiver is positioned at a known location relative to the pipeline. In some embodiments, the low frequency electromagnetic receiver is positioned at a location external to the pipeline.

In some embodiments, the low frequency electromagnetic receiver is positioned above ground. For instance, in some embodiments illustrated in FIG. 1, low frequency electromagnetic receiver 20 may be positioned at a known location above ground 16 to detect the pipeline pig 12 as it passes through pipeline 14. In some embodiments, low frequency electromagnetic receiver 20 may be positioned at different locations above ground 16 to locate pipeline pig 12 that may have stalled in pipeline 14.

Control Circuits

Control circuits generally refer to circuits that are configured to receive and process low frequency electromagnetic signals. In some embodiments, a low frequency electromagnetic receiver communicates the received low frequency electromagnetic signal from a pipeline pig to a control circuit for the transforming.

The methods and systems of the present disclosure can utilize various types of control circuits. For instance, in some embodiments, the control circuit includes a pitch shifting circuit configured to transform the received low frequency electromagnetic signal to an audible frequency signal by a pitch shifting process. In some embodiments, the pitch shifting process raises or lowers the pitch of an audio signal by an interval. In some embodiments, the pitch shifting process multiplies the received low frequency electromagnetic signal to an audible frequency range (e.g., 22 Hz×32=704 Hz). In some embodiments illustrated in FIG. 1, control circuit 22 may pitch shift (i.e., multiply the frequency of) low frequency electromagnetic signal 18a from a low frequency electromagnetic receiver 20 to an audible frequency range, such as about 700 Hz.

In some embodiments, the control circuit includes a frequency mixing circuit configured to transform the received low frequency electromagnetic signal to an audible frequency signal by a frequency mixing process. In some embodiments, the frequency mixing process combines two applied signals to produce a new signal. A frequency mixing circuit (i.e., a frequency mixer) is a circuit that creates new frequencies by two signals applied to it. For example, a frequency mixing circuit can produce a new signal from two applied signals at the sum and difference of the original frequencies (e.g., 22 Hz+700 Hz=722 Hz). Frequency mixing circuits are used to shift signals from one frequency range to another in a process known as heterodyning.

In some preferred embodiments, the methods and systems of the present disclosure may audibly distinguish noise from a pipeline pig's low frequency electromagnetic signal through pitch shifting because their outputs are further apart when multiplied. For instance, in some embodiments, a 1 Hz difference between noise and the pipeline pig's low frequency electromagnetic signal can be more easily heard and differentiated after pitch shifting (multiplying). In particular, when pitch shifted, a 21 Hz noise and a 22 Hz pipeline pig low frequency electromagnetic signal shifted by a multiple of 32 produces a noise output of 672 Hz versus 704 Hz for the pipeline pig, a difference of 32 Hz.

However, in some embodiments, frequency mixing may not provide a sufficient spread between the noise and pipeline pig output signals to audibly, or relatively easily, distinguish the signal. For example, shifting by 700 Hz a 21 Hz noise and a 22 Hz pipeline pig signal outputs only a 1 Hz difference (721 vs. 722).

The control circuits of the present disclosure may be in communication with low frequency electromagnetic receivers in various manners. For instance, in some embodiments, the low frequency electromagnetic receiver is in communication with the control circuit through a wireless connection. In some embodiments, the low frequency electromagnetic receiver is in communication with the control circuit through a wired connection.

Moreover, the control circuits of the present disclosure may receive and process low frequency electromagnetic signals in various manners.

For instance, in some embodiments, the control circuits of the present disclosure are configured to amplify the received low frequency electromagnetic signal. In some embodiments, the control circuits of the present disclosure are configured to filter the received low frequency electromagnetic signal to reduce noise. In some embodiments, the control circuits of the present disclosure are configured to filter the audible frequency signal to further reduce noise. In some embodiments, the control circuits of the present disclosure are configured to amplify the audible frequency signal. In some embodiments, the methods of the present disclosure also include one or more step of amplifying the received low frequency electromagnetic signal, filtering the received low frequency electromagnetic signal to reduce noise, filtering the audible frequency signal to further reduce noise, amplifying the audible frequency signal, or combinations thereof.

In some embodiments illustrated in FIG. 1, low frequency electromagnetic signal 18a received by low frequency electromagnetic receiver 20 is communicated to control circuit 22, where it is transformed. In some embodiments, low frequency electromagnetic receiver 20 filters the background noises before communicating the low frequency electromagnetic signal 18a to control circuit 22. Control circuit 22 may then amplify the low frequency electromagnetic signal and may further filter the signal to reduce noises (e.g., from power lines). Control circuit 22 may then pitch shift the received low frequency electromagnetic signal, thereby multiplying the received low frequency signal to an audible frequency signal.

Speakers

Speakers generally refer to devices that are configured to output an audible frequency signal. In some embodiments, a speaker in communication with a control circuit outputs the audible frequency signal for listening by a user. The methods and systems of the present disclosure can utilize various types of speakers.

For instance, in some embodiments, the speaker includes a two-way speaker. In some embodiments, the speaker includes a three-way speaker. In some embodiments, the speaker is configured to allow a user to audibly listen to a low frequency electromagnetic signal received from a pipeline pig.

In some embodiments illustrated in FIG. 1, an audible frequency signal from control circuit 22 is communicated to speaker 24 for output whereby the human user listens to the audible frequency signal. Speaker 24 allows a human user to audibly listen to the low frequency electromagnetic signal 18a received from pipeline pig 12 by low frequency electromagnetic receiver 20. Because all of the incoming signal and noise received by low frequency electromagnetic receiver 20 are transformed, the user can audibly differentiate a valid low frequency electromagnetic signal 18a from other noise, which is a very effective means of locating pipeline pig 12.

The speakers of the present disclosure may be configured to output various types of audible frequency signals. For instance, in some embodiments, the audible frequency signal includes a frequency range from about 20 Hz to about 20 kHz. In some embodiments, the audible frequency signal includes a frequency range from about 20 Hz to about 1 kHz. In some embodiments, the audible frequency signal includes a frequency range from about 100 Hz to about 800 Hz. In some embodiments, the audible frequency signal includes a frequency range from about 700 Hz to about 800 Hz.

Moreover, in some embodiments, the audible frequency signal may differ from noise in pitch, intensity (amplitude), and pattern (for pulsed transmitters). A user can also hear the difference in "coded" transmitters, which send bursts of different frequencies (e.g., 22 Hz followed by 15 Hz). The different frequencies, after pitch shifting, is audible as a high tone followed by a lower tone. The human user can hear the signal strength rise and fall as the pipeline pig and transmitter approach and pass the antenna.

The speakers of the present disclosure may be in communication with control circuits in various manners. For instance, in some embodiment, the speaker is in communication with the control circuit through a wireless connection. In some embodiments, the speaker is in communication with the control circuit through a wired connection.

Geophones

In some embodiments, the systems of the present disclosure may also include a geophone. In some embodiments, the methods of the present disclosure also include a step of combining a received low frequency electromagnetic signal with a signal received from a geophone. In some embodiments, the geophone is configured to convert ground movement into voltage. In some embodiments, the geophone is in communication with a control circuit. In some embodiments, the control circuit is configured to receive a signal from the geophone and combine the signal with an audible frequency signal. For instance, in some embodiments illustrated in FIG. 1, a signal received by geophone 26 can be communicated to control circuit 22, amplified, and mixed with the transformed low frequency electromagnetic signal.

In some embodiments, a signal received by a geophone may be amplified and/or filtered prior to being mixed with a low frequency electromagnetic signal. In some embodiments, the combined geophone and low frequency electromagnetic signals allows a user to listen to one audio source and hear the low frequency electromagnetic signal at the same time as the audio from the geophone. In some embodiments, the audio source is in the form of a transformed 22 Hz transmitter signal.

The geophones of the present disclosure may be in communication with control circuits in various manners. For instance, in some embodiments, the geophone is in communication with the control circuit through a wireless connection. In some embodiments, the geophone is in communication with the control circuit through a wired connection.

In some embodiments, the control circuits of the present disclosure are configured to amplify the combined geophone signal and audible frequency signal. In some embodiments, the control circuit is further configured to filter the combined geophone signal and audible frequency signal.

Visual Output Device

In some embodiments, the methods and systems of the present disclosure may also utilize a visual output device that is in communication with a control circuit. In some embodiments, the visual output device is configured to provide one or more visual outputs related to the received low frequency electromagnetic signal. In some embodiments, the visual output device is configured to provide one or more visual outputs related to the audible frequency signal.

In some embodiments, the visual output device is in the form of a display screen, such as a graphical user interface. In some embodiments, the visual output device is in the form of a light switch. In some embodiments illustrated in FIG. 1, visual output device 28 indicates detection of low frequency electromagnetic signal 18a and/or electromagnetic transmitter 18.

The visual output devices of the present disclosure can be in communication with control circuits in various manners. For instance, in some embodiments, the visual output device is in communication with the control circuit through a wireless connection. In some embodiments, the visual output device is in communication with the control circuit through a wired connection.

Pipeline Pigs

In some embodiments, the systems of the present disclosure may also include a pipeline pig. Additionally, the methods and systems of the present disclosure may be applicable for use with various pipeline pigs.

In some embodiments, the pipeline pig includes an electromagnetic transmitter configured to emit a low frequency electromagnetic signal to a low frequency electromagnetic receiver. Non-limiting examples of electromagnetic transmitters are disclosed in U.S. Pat. Nos. 9,172,406 and 2,601,248, the teachings of which are incorporated herein by reference. In some embodiments, the low frequency electromagnetic signal includes a typical range of about 5 to 32 Hz.

In some embodiments, the electromagnetic transmitter is in communication with the control circuit. For instance, in some embodiments, the electromagnetic transmitter is in communication with the control circuit through a wireless connection. For instance, in some embodiments illustrated in FIG. 1, transmitter 18 is in communication with control circuit 22 through a wireless connection.

Various methods may be utilized to locate pipeline pigs. For instance, in some embodiments, the locating includes hearing the audible frequency signal. In some embodiments, the locating includes identifying the low frequency electromagnetic signal in the audible frequency signal. In some embodiments, the locating includes tracking the pipeline pig. In some embodiments, the tracking occurs in real-time. For instance, in some embodiments illustrated in FIG. 1, the location is performed in real time so that a user, via hearing, can identify the low frequency electromagnetic signal 18a and hear its approach and passing of the location of the low frequency electromagnetic receiver 20.

In some embodiments, the locating of a pipeline pig includes moving a low frequency electromagnetic receiver around the pipeline until a user hears an audible frequency signal. For instance, in some embodiments illustrated in FIG. 1, a user may search for a stationary pipeline pig 12 by moving low frequency electromagnetic receiver 20 along pipeline 14. Thereafter, the user may hear an audible frequency signal when the low frequency electromagnetic receiver 20 is directly aligned perpendicular to transmitter 18 of pipeline pig 12.

Additional Embodiments

Reference will now be made to more specific embodiments of the present disclosure and experimental results that provide support for such embodiments. However, Applicant notes that the disclosure below is for illustrative purposes only and is not intended to limit the scope of the claimed subject matter in any way.

Example 1. Operation of a control circuit

Figure 3:
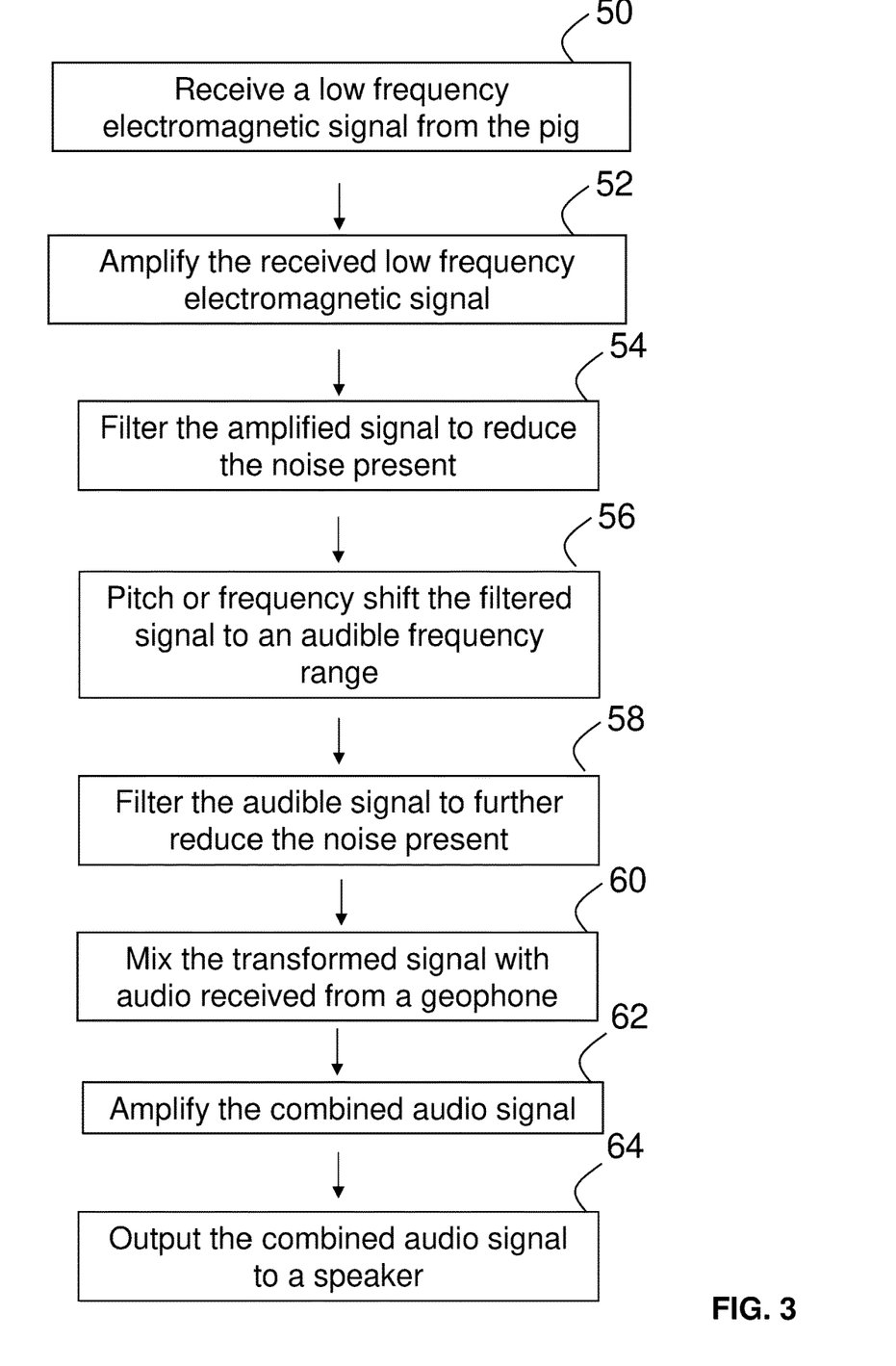
FIG. 3 illustrates the operation of a control circuit according to one or more aspects of the disclosure.

FIG. 3 illustrates an operation of a control circuit for locating a pipeline pig in a pipeline. In this Example, the operation of the control circuit includes: receiving a low frequency electromagnetic signal from a pipeline pig (block 50); amplifying the received low frequency electromagnetic signal (block 52); filtering the amplified signal to reduce the noise present (block 54); pitch or frequency shifting the filtered signal to an audible frequency range (block 56); filtering the audible frequency signal to further reduce the noise present (block 58); mixing the transformed signal with audio received from a geophone (block 60); amplifying the combined audio signal (block 62); and outputting the combined audio signal to a speaker (block 64).

Figure 4:
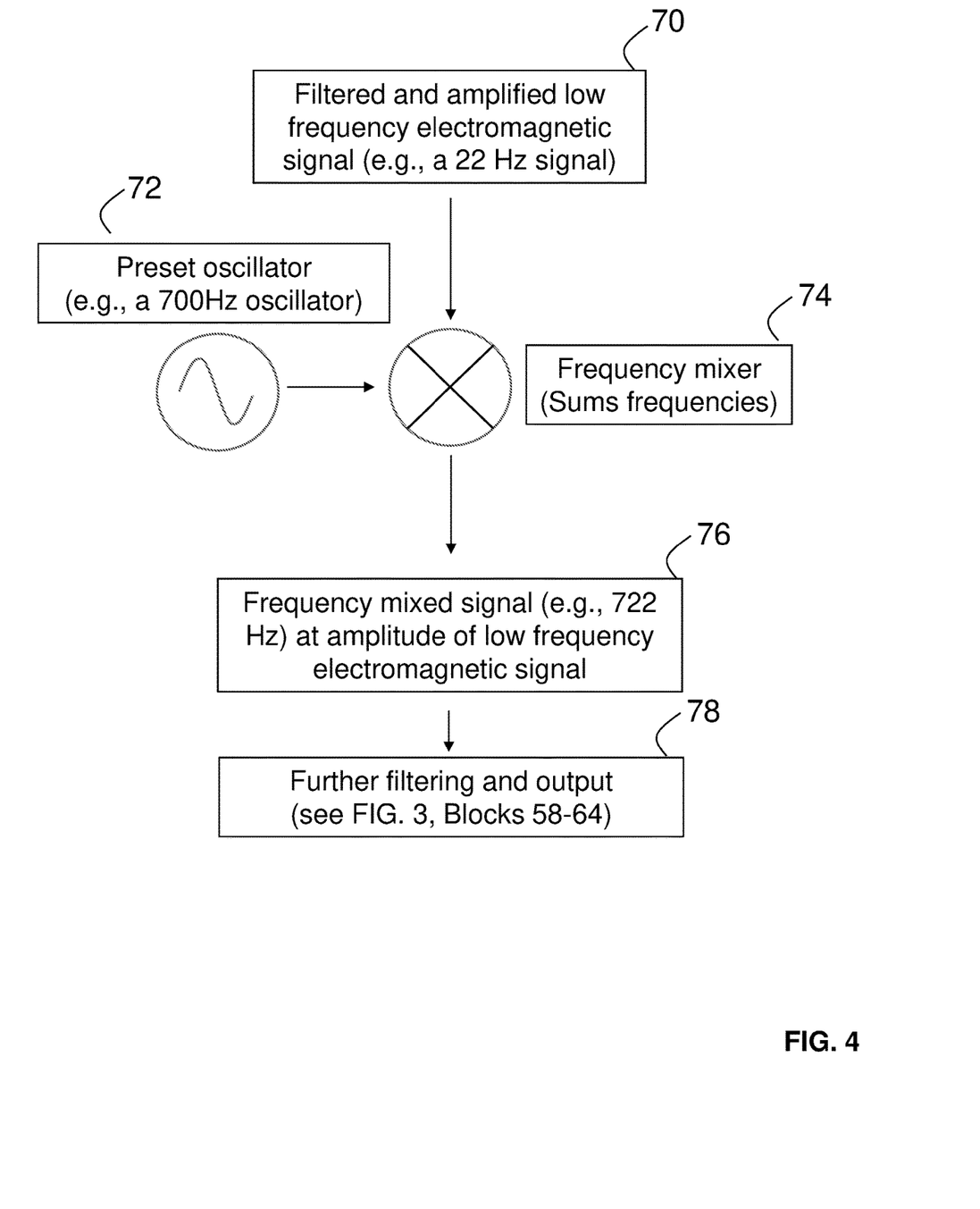
FIG. 4 illustrates the operation of a frequency mixing circuit in a control circuit according to one or more aspects of the disclosure.

FIG. 4 illustrates the operation of a frequency mixing circuit in a control circuit. In this Example, a filtered and amplified low frequency electromagnetic signal (block 70) (e.g., a filtered and amplified low frequency electromagnetic signal from block 54 in FIG. 3) is combined with a preset oscillator signal (block 72) in a frequency mixer (block 74) to produce a frequency mixed signal at the amplitude of the low frequency electromagnetic signal (block 76). The frequency mixed signal may then be further filtered, processed and/or outputted (block 78) (e.g., FIG. 3, blocks 58-64).

Figure 5:
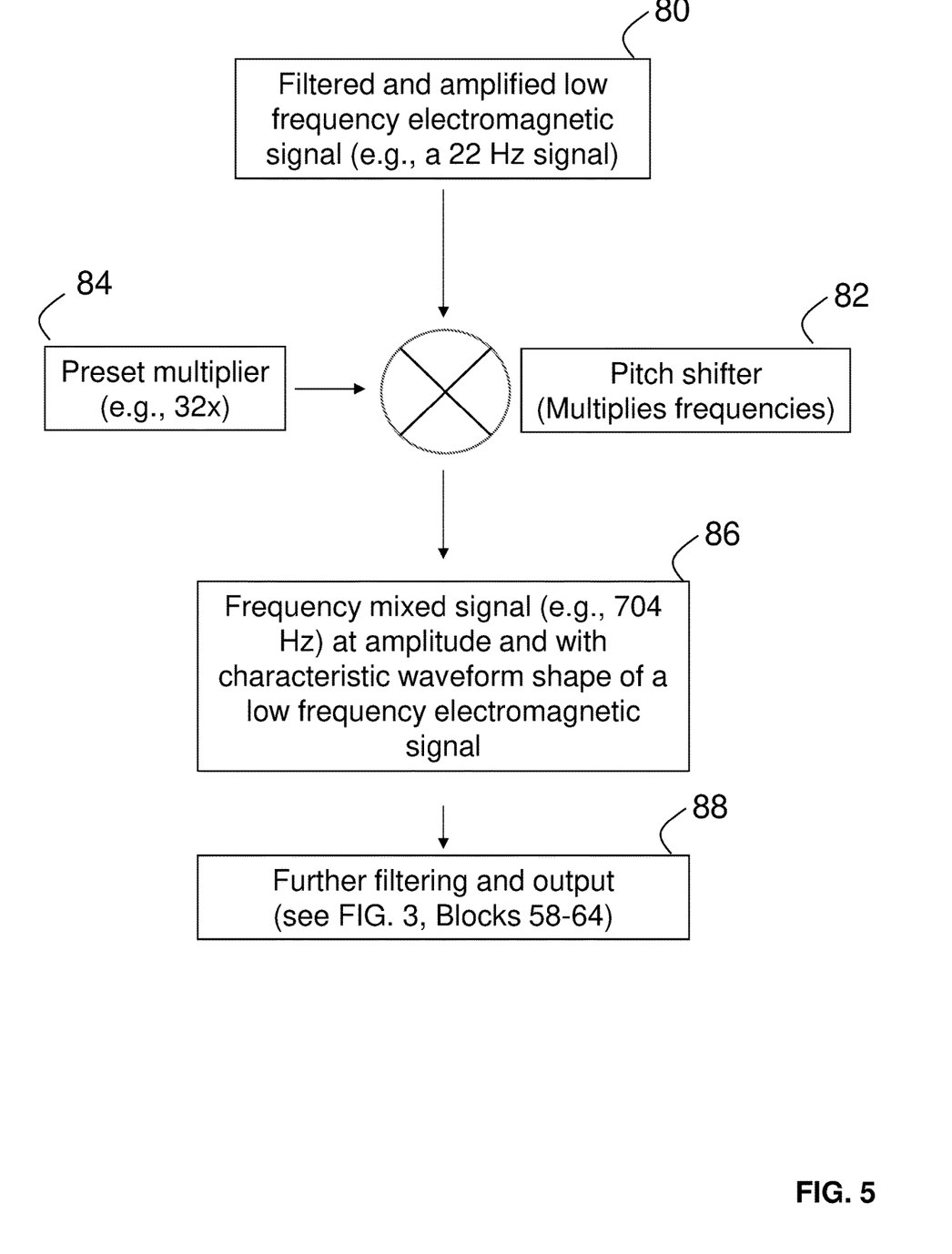
FIG. 5 illustrates the operation of a pitch shifting circuit in a control circuit according to one or more aspects of the disclosure.

FIG. 5 illustrates the operation of a pitch shifting circuit in a control circuit. In this Example, a filtered and amplified low frequency electromagnetic signal (block 80) (e.g., a filtered and amplified low frequency electromagnetic signal from block 54 in FIG. 3) is multiplied in a pitch shifter (block 82) with a preset multiplier (block 84) to produce a frequency mixed signal at an amplitude and with characteristic waveform shape of the low frequency electromagnetic signal (block 86). The frequency mixed signal may then be further filtered, processed and/or outputted (block 88) (e.g., FIG. 3, blocks 58-64).

Figure 6:
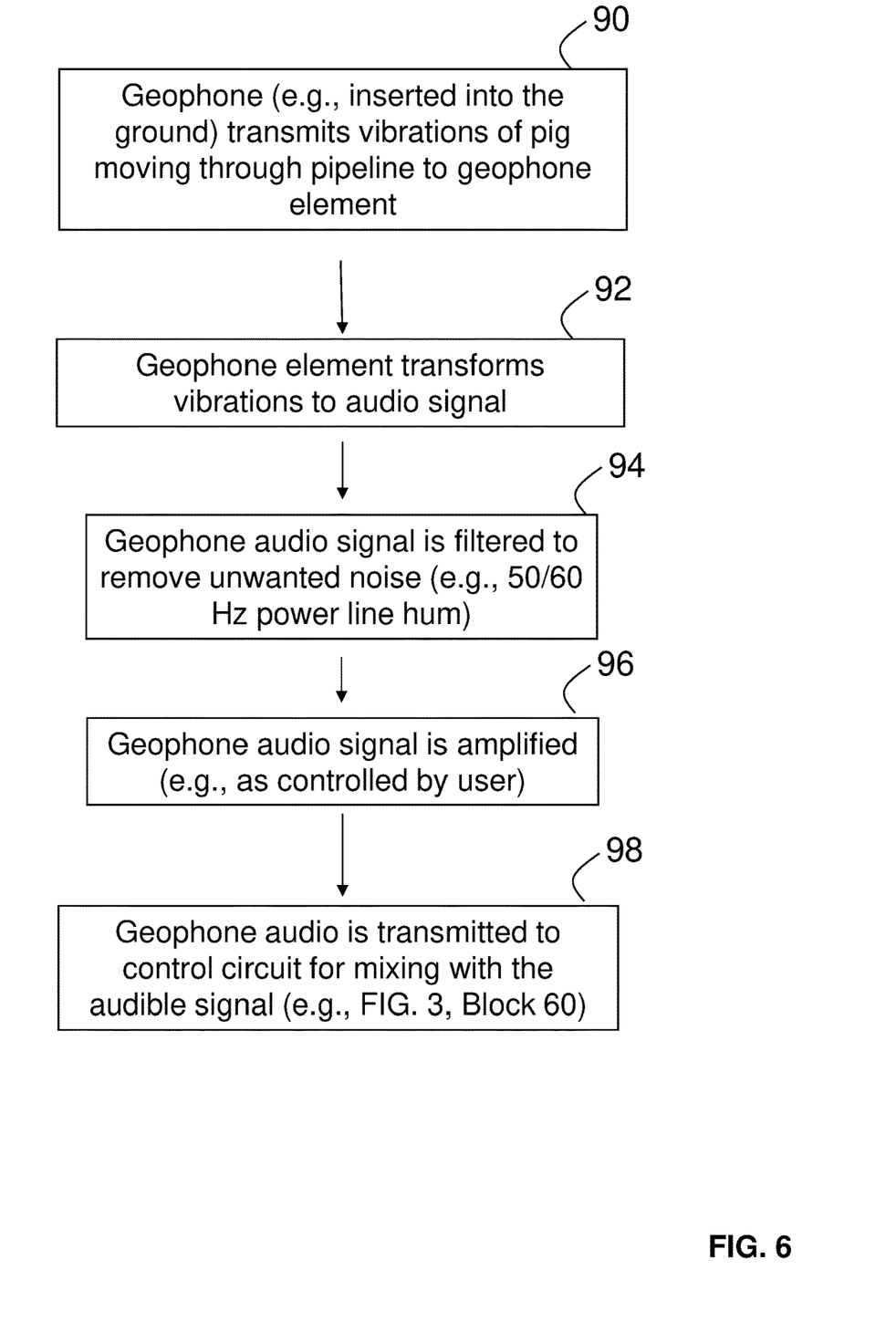
FIG. 6 illustrates the operation of a geophone according to one or more aspects of the disclosure.

FIG. 6 illustrates the operation of a geophone according to one or more aspects of the disclosure. In this Example, a geophone (e.g., geophone 26 inserted into ground 16 through spike 27, as illustrated in FIG. 1) transmits vibrations of a pipeline pig moving through a pipeline to a geophone element (block 90) (e.g., a spring-mounted wire coil moving within the field of a case-mounted permanent magnet to generate an electrical signal related to the vibration of the coil). Next, the geophone element transforms the received vibrations to an audio signal (block 92). The geophone audio signal is then filtered to remove unwanted noise (e.g., a 50/60 Hz power line hum) (block 94). Thereafter, the geophone audio signal is amplified (e.g., as controlled by a user) (block 96). Finally, the geophone audio signal is transmitted to a control circuit for mixing with the audible signal (block 98) (e.g., FIG. 3, Block 60).

Figure 7:
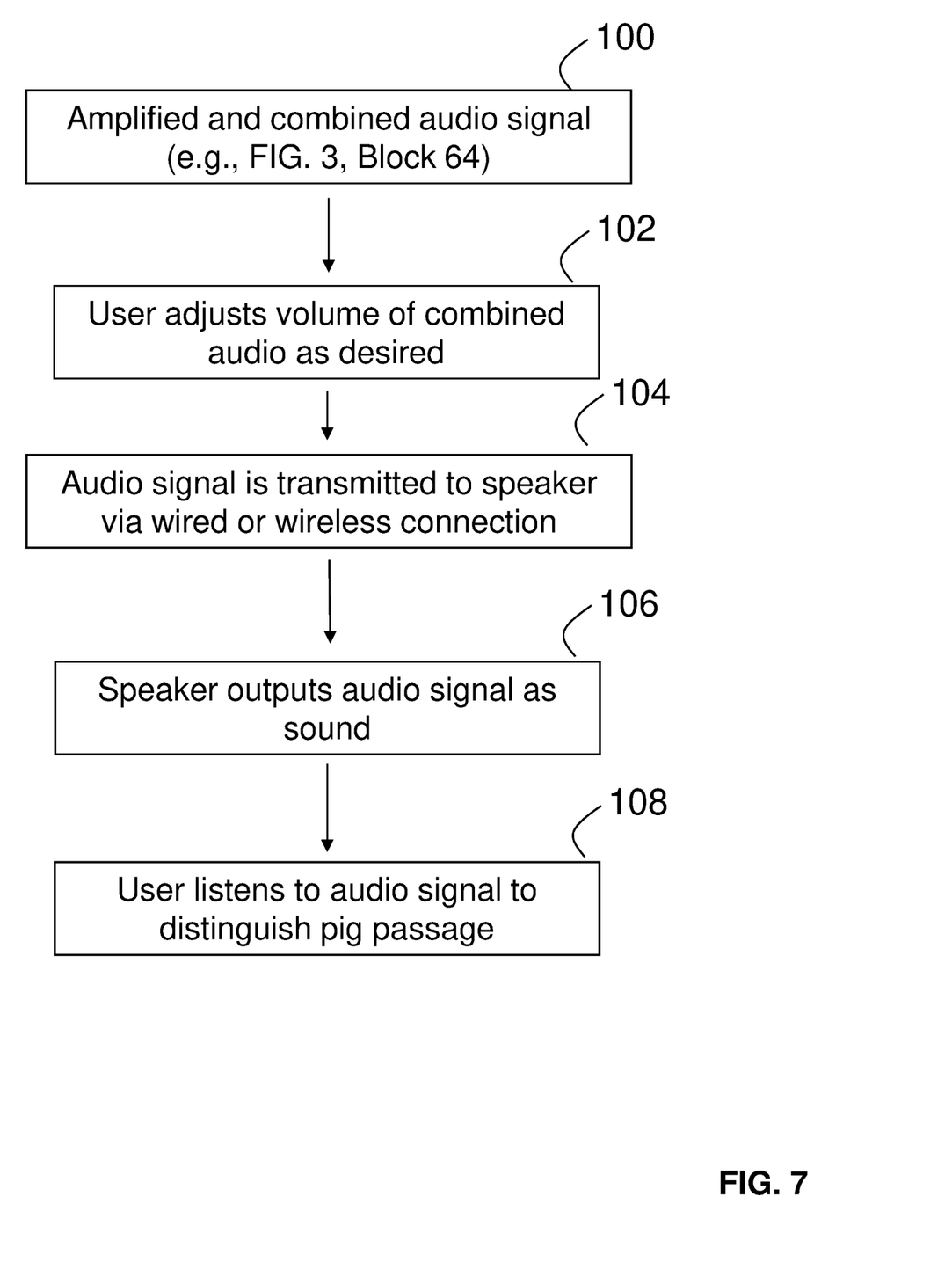
FIG. 7 illustrates the operation of a speaker according to one or more aspects of the disclosure.

FIG. 7 illustrates the operation of a speaker according to one or more aspects of the disclosure for outputting an audio signal from a circuit, such as an amplified and combined audio signal (block 100) shown in block 64 of FIG. 3. In this Example, a user may adjust the volume of the amplified and combined audio signal (block 102). The audio signal is then transmitted to the speaker via a wired or wireless connection (block 104). Thereafter, the speaker outputs the audio signal as sounds (block 106). The user then listens to the audio signal to distinguish the pipeline pig passage through a pipeline (block 108).

Figure 8:
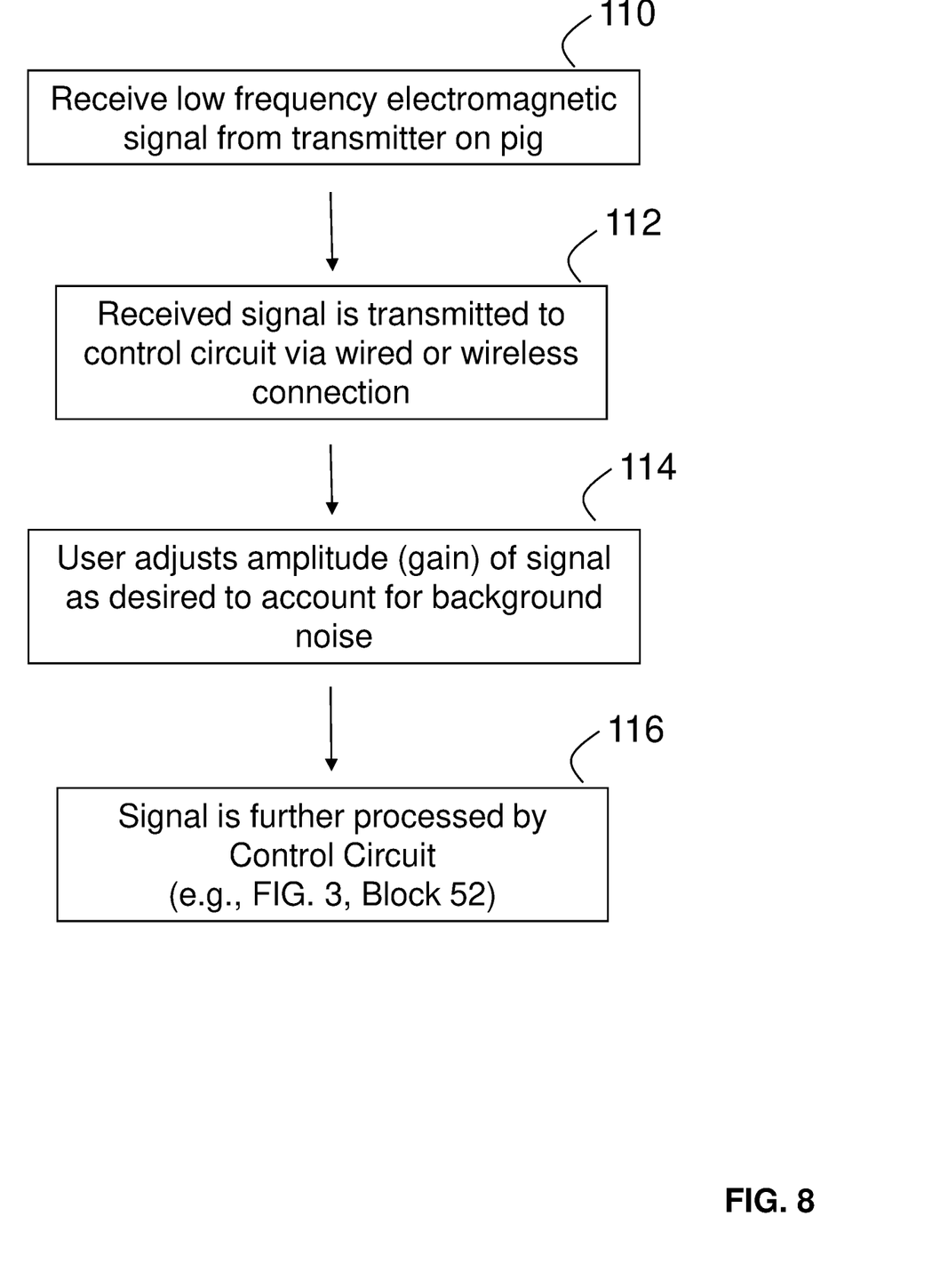
FIG. 8 illustrates the operation of a low frequency electromagnetic receiver (e.g., an antenna) according to one or more aspects of the present disclosure.

FIG. 8 illustrates the operation of a low frequency electromagnetic receiver (e.g., an antenna) according to one or more aspects of the present disclosure. In this Example, a low frequency electromagnetic signal is received from a pipeline pig transmitter (block 110). The received signal is then transmitted to a control circuit via a wired or wireless connection (block 112). A user may then adjust the amplitude (gain) of the received signal as desired to account for background noise (block 114). The received signal is then further processed by the control circuit (block 116) (e.g., FIG. 3, block 52).

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A pipeline pig tracking and locator system, the system comprising:
   a control circuit;

a low frequency electromagnetic receiver in communication with the control circuit,
  wherein the low frequency electromagnetic receiver is configured to communicate a received low frequency electromagnetic signal from a pipeline pig to the control circuit, and
  wherein the control circuit comprises at least one of a pitch shifting circuit or a frequency mixing circuit configured to transform the received low frequency electromagnetic signal to an audible frequency signal; and
a speaker in communication with the control circuit,
  wherein the speaker is configured to output the transformed audible frequency signal.

2. The system of claim 1, wherein the low frequency electromagnetic receiver is configured to receive a low frequency electromagnetic signal, and wherein the low frequency electromagnetic signal comprises a frequency ranging from about 3 Hz to about 300 Hz.

3. The system of claim 1, wherein the low frequency electromagnetic receiver is in the form of an antenna.

4. The system of claim 1, wherein the control circuit comprises a pitch shifting circuit configured to transform the received low frequency electromagnetic signal to the audible frequency signal by a pitch shifting process, wherein the pitch shifting process multiplies the received low frequency electromagnetic signal to an audible frequency range.

5. The system of claim 1, wherein the control circuit comprises a frequency mixing circuit configured to transform the received low frequency electromagnetic signal to the audible frequency signal by a frequency mixing process, wherein the frequency mixing process combines two applied signals to produce a new signal.

6. The system of claim 1, wherein the speaker is configured to allow a user to audibly listen to the low frequency electromagnetic signal received from the pipeline pig.

7. The system of claim 1, further comprising a geophone in communication with the control circuit, wherein the control circuit is configured to receive a signal from the geophone and combine the signal with the audible frequency signal.

8. The system of claim 1, further comprising a visual output device in communication with the control circuit, wherein the visual output device is configured to provide one or more visual outputs related to the received low frequency electromagnetic signal, the audible frequency signal, or combinations thereof.

9. The system of claim 1, further comprising a pipeline pig, wherein the pipeline pig comprises an electromagnetic transmitter configured to emit the low frequency electromagnetic signal to the low frequency electromagnetic receiver.

10. A method for locating a pipeline pig in a pipeline, the method comprising:
  positioning a low frequency electromagnetic receiver at a location relative to the pipeline;
  receiving, by the low frequency electromagnetic receiver, a low frequency electromagnetic signal from the pipeline pig located in the pipeline;
  utilizing at least one of a pitch shifting circuit or a frequency mixing circuit to transform the low frequency electromagnetic signal received by the low frequency electromagnetic receiver to an audible frequency signal;
  listening, by a user, to the transformed audible frequency signal; and
  locating the pipeline pig within the pipeline.

11. The method of claim 10, further comprising a step of positioning the pipeline pig in the pipeline.

12. The method of claim 10, wherein the pipeline pig comprises an electromagnetic transmitter configured to emit the low frequency electromagnetic signal to the low frequency electromagnetic receiver.

13. The method of claim 10, wherein the low frequency electromagnetic receiver is in the form of an antenna.

14. The method of claim 10, wherein the received low frequency electromagnetic signal comprises a frequency ranging from about 3 Hz to about 300 Hz.

15. The method of claim 10, wherein the low frequency electromagnetic receiver is positioned at a known location relative to the pipeline.

16. The method of claim 10, wherein the low frequency electromagnetic receiver is positioned at a location external to the pipeline.

17. The method of claim 10, wherein the low frequency electromagnetic receiver is positioned above ground.

18. The method of claim 10, wherein the low frequency electromagnetic receiver communicates the received low frequency electromagnetic signal from the pipeline pig to a control circuit for the transforming.

19. The method of claim 18, wherein the control circuit comprises a pitch shifting circuit configured to transform the received low frequency electromagnetic signal to the audible frequency signal by a pitch shifting process, wherein the pitch shifting process multiplies the received low frequency electromagnetic signal to an audible frequency range.

20. The method of claim 18, wherein the control circuit comprises a frequency mixing circuit configured to transform the received low frequency electromagnetic signal to the audible frequency signal by a frequency mixing process, wherein the frequency mixing process combines two applied signals to produce a new signal.

21. The method of claim 10, further comprising a step of combining the received low frequency electromagnetic signal with a signal received from a geophone, wherein the geophone is in communication with a control circuit, and wherein the control circuit receives the signal from the geophone and combines the signal with the audible frequency signal.

22. The method of claim 10, wherein a speaker in communication with a control circuit outputs the audible frequency signal for listening by the user.

23. The method of claim 10, wherein a visual output device in communication with a control circuit provides one or more visual outputs related to the received low frequency electromagnetic signal, the audible frequency signal, or combinations thereof.

24. The method of claim 1, wherein the locating comprises hearing the audible frequency signal.

25. The method of claim 1, wherein the locating comprises identifying the low frequency electromagnetic signal in the audible frequency signal.

26. The method of claim 10, wherein the locating comprises tracking the pipeline pig.

* * * * *